United States Patent
Inoue et al.

(10) Patent No.: US 10,502,960 B2
(45) Date of Patent: Dec. 10, 2019

(54) INFORMATION DISPLAY ASSEMBLY

(71) Applicant: HONDA MOTOR CO., LTD., Tokyo (JP)

(72) Inventors: Taishi Inoue, Wako (JP); Motoharu Yokoi, Wako (JP); Hayato Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 15/908,020

(22) Filed: Feb. 28, 2018

(65) Prior Publication Data

US 2018/0267321 A1 Sep. 20, 2018

(30) Foreign Application Priority Data

Mar. 14, 2017 (JP) ................................. 2017-048481

(51) Int. Cl.
G02B 27/01 (2006.01)

(52) U.S. Cl.
CPC ..... *G02B 27/0176* (2013.01); *G02B 27/0149* (2013.01); *G02B 2027/0169* (2013.01); *G02B 2027/0178* (2013.01)

(58) Field of Classification Search
CPC ............ G02B 27/0176; G02B 27/0149; G02B 2027/0169; G02B 2027/0178
See application file for complete search history.

(56) References Cited

U.S. PATENT DOCUMENTS

| | | | | |
|---|---|---|---|---|
| 10,380,763 | B2 * | 8/2019 | Levinshtein | ....... G02B 27/0172 |
| 2010/0226017 | A1 * | 9/2010 | Spaller | ............... G02B 27/0172 |
| | | | | 359/630 |
| 2012/0317706 | A1 * | 12/2012 | Lebel | ........................ F41H 1/08 |
| | | | | 2/422 |
| 2014/0000014 | A1 | 1/2014 | Redpath et al. | |
| 2016/0026253 | A1 * | 1/2016 | Bradski | ................ G02B 27/225 |
| | | | | 345/8 |

(Continued)

FOREIGN PATENT DOCUMENTS

| | | |
|---|---|---|
| JP | 2008-285799 | 11/2008 |
| JP | 2009-180954 A | 8/2009 |
| JP | 2017-218696 | 12/2017 |

OTHER PUBLICATIONS

European Search Report dated Aug. 21, 2018, 6 pages.
Japanese Office Action with English Translation dated Jan. 29, 2019, 8 pages.

*Primary Examiner* — Ricardo Osorio
(74) *Attorney, Agent, or Firm* — Rankin, Hill & Clark LLP

(57) ABSTRACT

Provided is an information display assembly that is hardly affected by an external force such as traveling wind when mounted on a helmet and that ensures easy attachability and detachability to and from the helmet. In an information display assembly including a display unit displaying information, and a frame connected to the display unit to allow mounting of the display unit on the helmet, the frame has resiliency and is provided at opposite ends thereof with pressing parts, and the pressing parts are fixed on an inner side of the helmet by restoring force of resilient deformation. The display unit and the frame are commonly provided at a single location therebetween with a connecting par. The display unit is displaceably supported relative to the frame.

19 Claims, 5 Drawing Sheets

(56) References Cited

U.S. PATENT DOCUMENTS

| | | | |
|---|---|---|---|
| 2016/0062454 A1* | 3/2016 | Wang | G09G 5/003 345/633 |
| 2016/0147070 A1* | 5/2016 | Border | G02B 27/0176 359/633 |
| 2016/0170482 A1* | 6/2016 | Yajima | G06F 3/012 345/8 |
| 2016/0363763 A1* | 12/2016 | Yang | G02B 27/0093 |
| 2019/0029528 A1* | 1/2019 | Tzvieli | A61B 5/6814 |

* cited by examiner

INFORMATION DISPLAY ASSEMBLY

INCORPORATION BY REFERENCE

The present application claims priority under 35 U.S.C. § 119 to Japanese Patent Application No. 2017-048481 filed on Mar. 14, 2017. The content of the application is incorporated herein by reference in its entirety.

TECHNICAL FIELD

The present invention relates to an information display assembly to be detachably mounted on a helmet.

BACKGROUND ART

Conventionally, techniques are known for detachably mounting, on a helmet, a head-mounted display assembly provided with a display that displays images (see, for example, Patent Document 1).

Disclosed in Patent Document 1 is a technique that in order to make a head-mounted display assembly commonly usable among a plurality of helmets, the head-mounted display assembly is mounted on each helmet by a holder, which has resiliency, while holding the outer side of the helmet fixedly in each of opposite directions.

PRIOR ART DOCUMENT

Patent Document

[Patent Document 1]
Japanese Patent Laid-Open No. 2008-285799

SUMMARY OF THE INVENTION

Problems to be Solved by the Invention

According to the technique described in Patent Document 1, the holder that serves to fix the head-mounted display assembly on the helmet exists on the outer side of the helmet, whereby there is a problem in that with a helmet for a rider of a saddle riding vehicle, for example, the head-mounted display assembly is prone to be significantly affected by an external force such as traveling wind. As the holder is fixed on the helmet at plural holding parts thereof, there is another problem that complex handling is needed upon attachment or detachment.

With the foregoing circumstances in view, the present invention has, as an object thereof, the provision of an information display assembly that is hardly affected by an external force such as traveling wind when mounted on a helmet and that ensures easy attachability and detachability to and from the helmet.

Means for Solving the Problems

An aspect of the present invention provides an information display assembly including a display unit (2) displaying information, and a frame (3) connected to the display unit (2) to allow mounting of the display unit (2) on a helmet. The frame (3) has resiliency and is provided at opposite ends thereof with pressing parts (31, 32), and the pressing parts (31, 32) are fixed on an inner side of the helmet by restoring force of resilient deformation. The display unit (2) and the frame (3) are commonly provided at a single location therebetween with a connecting part (4). The display unit (2) is displaceably supported relative to the frame (3).

In the aspect of the invention described above, the connecting part (4) may be provided with a mechanism for rotation in a pitch direction (P).

In the aspect of the invention described above, the connecting part (4) may also be provided with a mechanism for rotation in a yaw direction (Y).

In the aspect of the invention described above, the connecting part (4) may also be provided with a sliding function configured to allow the display unit (2) to slidingly move along the frame (3).

In the aspect of the invention described above, the pressing parts (31, 32) may also be provided with auxiliary fixing function portions (31b, 32b), respectively.

Effects of the Invention

Owing to the mounting of the information display assembly on the inner side of the helmet, the aspect of the present invention can suppress effects from an external force. In addition, owing to the attachment of the frame under flexed conditions, wide application versatility and easy attachability and detachability are ensured. Further, the display unit can be supported displaceably relative to the frame by the connecting part. Furthermore, owing to the arrangement of the connecting part at the single location, effects of flexing of the frame on the display unit can be reduced.

In the aspect of the invention described above, owing to the provision of the mechanism for rotation in the pitch direction, the connecting part makes it possible to perform a positional adjustment of the display unit according to the individual differences of each user. Further, the attachment or detachment of goggles can be facilitated by moving the display unit in the pitch direction.

Further, in the aspect of the invention described above, owing to the provision of the mechanism for rotation in the yaw direction, the connecting part makes it possible to perform a positional adjustment of the display unit according to the individual differences of each user.

Furthermore, in the aspect of the invention described above, owing to the provision of the sliding function, the connecting part makes it possible to perform a positional adjustment of the display unit according to the individual differences of each user.

Still furthermore, in the aspect of the invention described above, owing to the provision of the auxiliary fixing function portions, the pressing parts can exhibit an enhanced fixing function on the helmet by rotation stoppers, slide stoppers and/or the like when the information display assembly is mounted on the helmet.

MODES FOR CARRYING OUT THE INVENTION

With reference to the drawings, a description will hereinafter be made about individual embodiments of the present invention. It is to be noted that in the following description, the descriptions of directions such as front-back, left-right and up-down represent the same directions as those relative to a user unless otherwise specifically indicated. It is also to be noted that signs FR, UP and LH presented in each view indicate a front side, upper side and left side of the user, respectively.

First Embodiment

Figure 1:
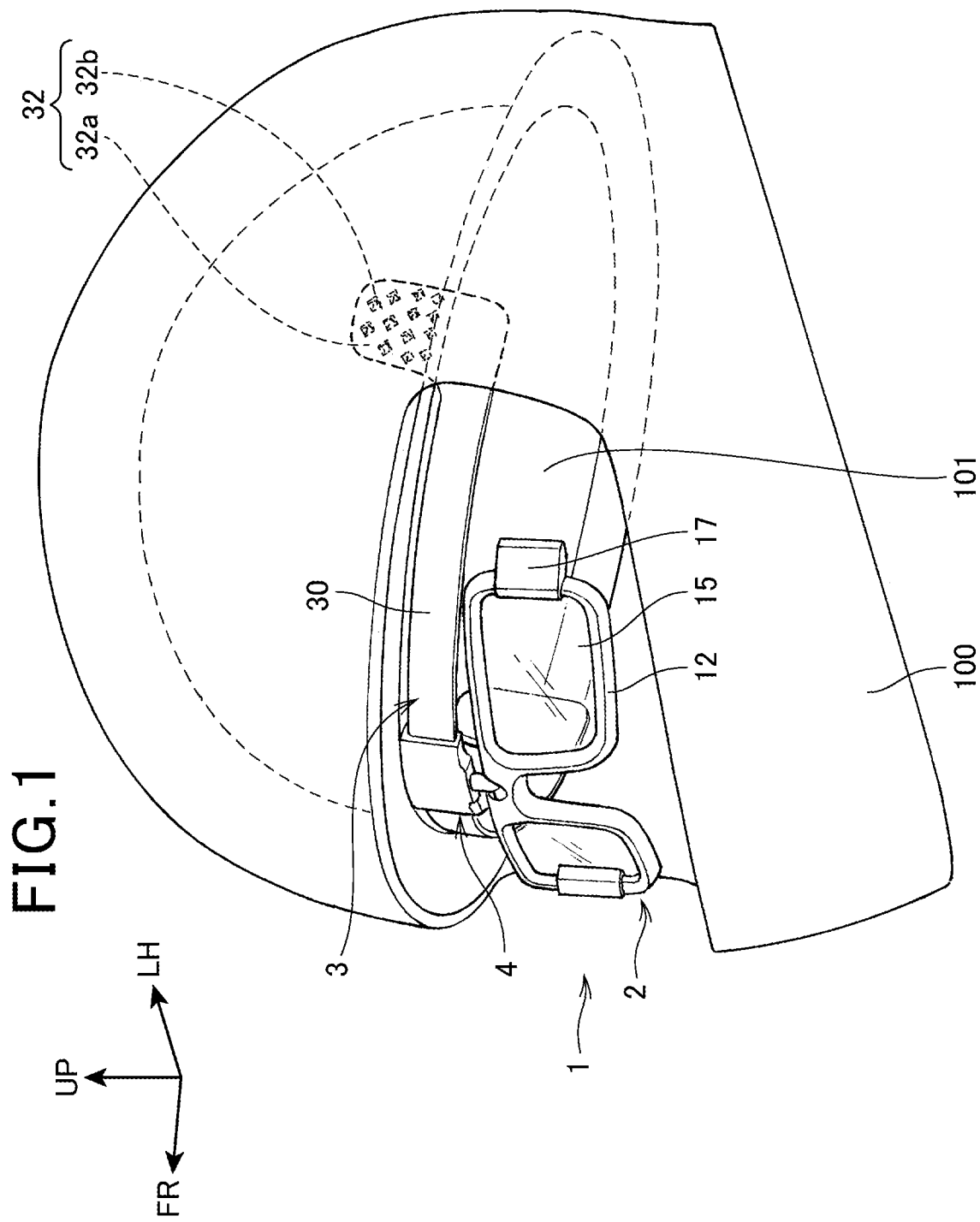
FIG. 1 is an explanatory diagram when an HMD assembly according to a first embodiment of the present invention has been mounted on a helmet.

FIG. 1 is a perspective view of an HMD assembly 1 according to a first embodiment of the present invention.

The HMD assembly (information display assembly) 1 is configured to be attachable and detachable to and from, for example, a helmet 100 for a rider of a saddle riding vehicle, and is a head-mounted display (HMD) assembly that is to be mounted on the helmet 100 and is to be applied together with the helmet 100 to the head.

The HMD assembly 1 includes a display unit main body 2 (display unit) which displays information, and also a frame 3 having an arcuate shape on which the display unit main body 2 (display unit) is supported.

Figure 2:
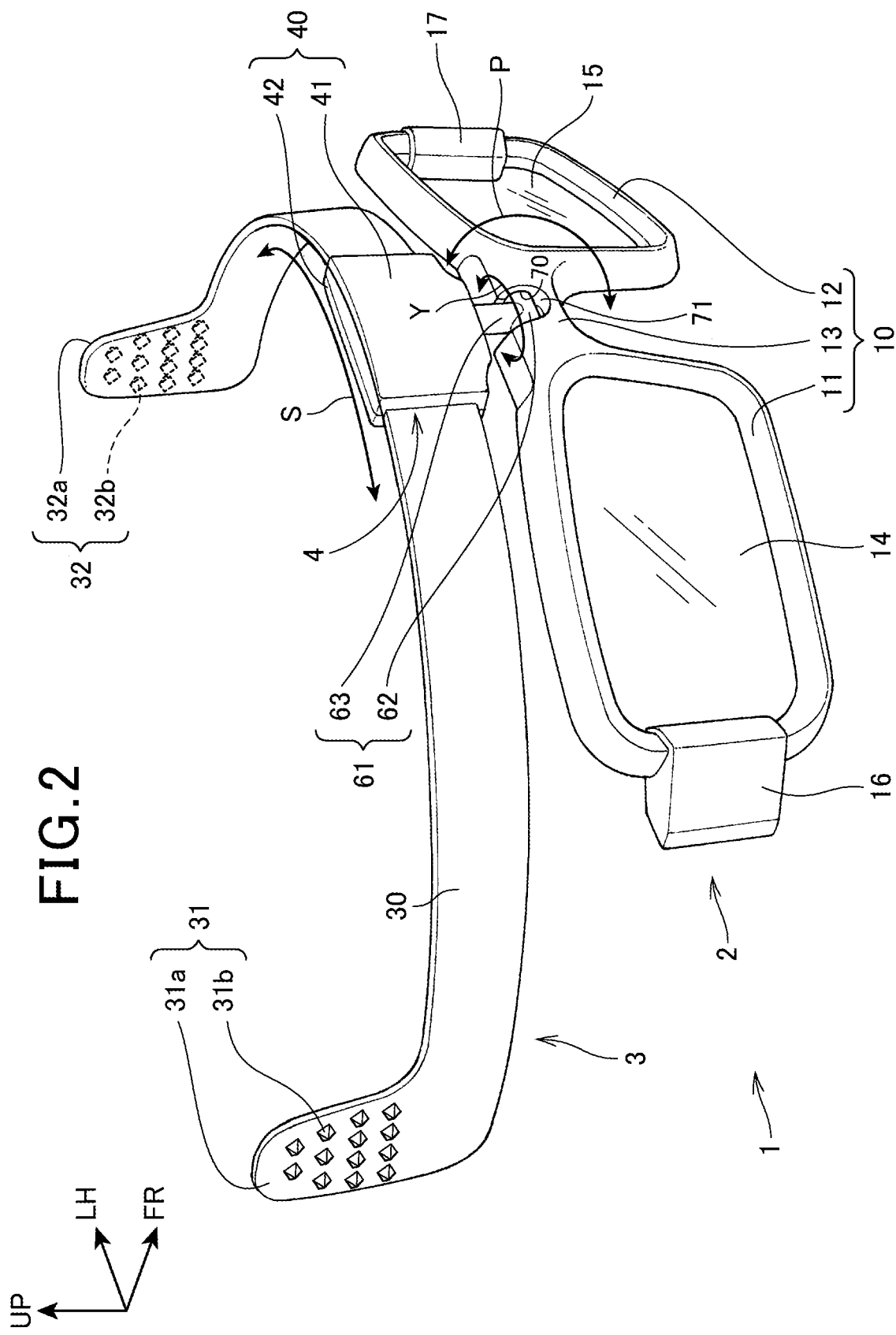
FIG. 2 is a perspective view of the HMD assembly according to the first embodiment.

As depicted in FIG. 2, the display unit main body 2 has a goggle-shaped frame 10. The goggle-shaped frame 10 has rectangular ring-shaped, left and right rim parts 11 and 12. The rim parts 11 and 12 are connected together via a tabular bridge portion 13. Supported on the respective rim parts 11 and 12 are transmission display elements 14 and 15 on which information are to be displayed. The transmission display elements 14 and 15 are configured so that information images projected from projection devices 16 and 17 can be reflected toward a field of vision and the real image of a scene ahead of the transmission display elements 14 and 15 can be transmitted toward the field of vision. The projection devices 16 and 17 each internally have a battery (not depicted), a communication unit (not depicted) that can perform communications with an external information processing device (not depicted), and a processing unit (not depicted), and on the basis of communications with the external information processing device, project images of information toward the transmission display elements 14 and 15.

Figure 3:
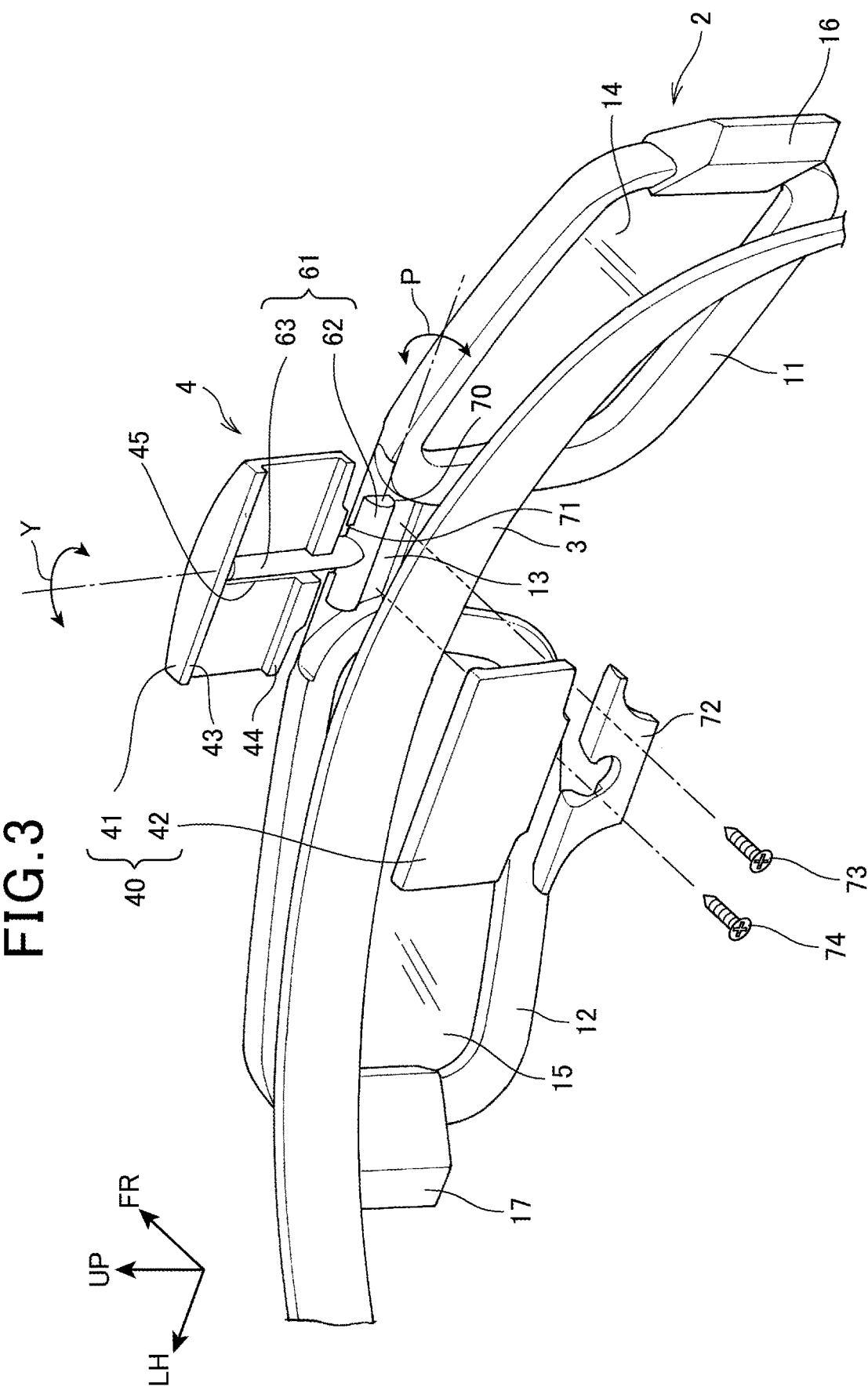
FIG. 3 is an exploded perspective view of a connecting part.

In the display unit main body 2, a connecting part 4 is connected to the bridge portion 13 via which the rim parts 11 and 12 are connected each other. As depicted in FIG. 3, the connecting part 4 has a T-shaped connecting rod 61 connected to the bridge portion 13. The connecting rod 61 includes a pitch rod portion 62 and a yaw rod portion 63. Formed in the bridge portion 13 are a pitch-rod-portion fitting slot 70 extending in a left-right direction and also a notch 71 (see FIG. 2) continuing into the pitch-rod-portion fitting slot 70. The pitch rod portion 62 is fitted in the pitch-rod-portion fitting slot 70 rotatably in the pitch direction P (see FIG. 2) and, when the pitch rod portion 62 is rotated in the pitch direction P, the yaw rod portion 63 is brought into fitting engagement with the notch 71.

The pitch rod portion 62 is provided with a rod cover 72, and the rod cover 72 is fastened on the bridge portion 13 by machine screws 73 and 74. Depending upon the degrees of tightening of the machine screws 73 and 74, the pressure of contact between the pitch rod portion 62 and the rod cover 72 is adjustable so that the frictional force to the pitch rod portion 62 can be adjusted. By the connecting rod 61, pitch-rod-portion fitting slot 70, notch 71 and rod cover 72, a mechanism for rotation in the pitch direction P is formed.

The yaw rod portion 63 is provided with a front cover 41. A yaw-rod-portion fitting slot 45 of an arcuate shape in cross-section is formed in the front cover 41, and the yaw rod portion 63 is fitted in the yaw-rod-portion fitting slot 45. On the front cover 41, a pair of guide ribs 43 and 44 are formed extending in a substantially horizontal direction. Between the guide rib 43 on an upper side and the guide rib 44 on a lower side, the frame 3 is disposed, and a rear cover 42 is fixed on the front cover 41 so that the frame 3 is held between the front and rear covers 41 and 42. The rear cover 42 and the front cover 41 are coupled together by a snap-fit structure (not depicted). With the front cover 41 and the rear cover 42 acting as an integral unit, the display unit main body 2 can rotate in the yaw direction Y about the yaw rod portion 63. The front cover 41 and rear cover 42 make up a cover unit 40. By the front cover 41, rear cover 42, yaw-rod-portion fitting slot 45 and yaw rod portion 63, a mechanism for rotation in the yaw direction Y is formed.

The frame 3 is held in place between the respective covers 41 and 42 under the cohesive force (frictional force) between the front cover 41 and the rear cover 42. Here, the front cover 41 and rear cover 42 are configured as the integral unit to produce a frictional force adjusted to such a level as allowing the display unit main body 2 to move in a sliding direction S (see FIG. 2) along the frame 3. When a force is applied in the sliding direction S to the display unit main body 2, the cover unit 40 moves against the frictional force along the frame 3. Therefore, the position of the display unit main body 2 relative to the frame 3 is adjustable in the sliding direction S.

By the bridge portion 13, cover unit 40, connecting rod 61, rod cover 72 and machine screws 73 and 74, the connecting part 4 is formed. By the connecting part 4, the display unit main body 2 is displaceably supported relative to the frame 3.

Figure 4:
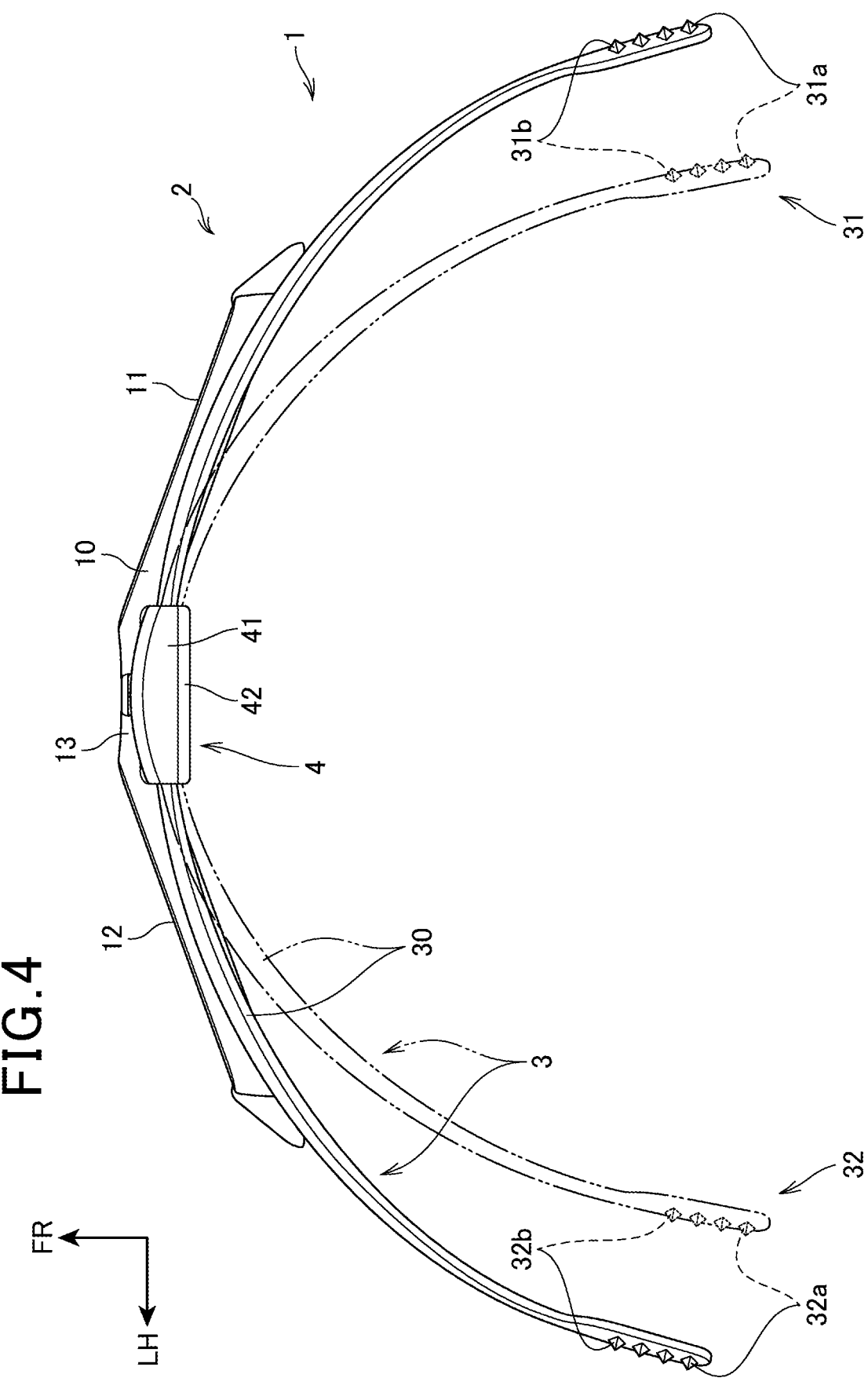
FIG. 4 is a plan view of the HMD assembly, and is also an explanatory diagram when a frame is flexed.

The frame 3 has a frame main body 30 in the form of a thin strip. The frame main body 30 is formed with a constant vertical width, and as depicted in FIG. 4, is bent in an arcuate form. The frame main body 30 is resiliently deformable, and is bent from a position indicated by a solid line toward a position indicated by a two-dot chain line in FIG. 4. On both left and right ends of the frame unit main body 30, pressing parts 31 and 32 are formed extending upward as depicted in FIG. 2. The pressing parts 31 and 32 are provided on outer surfaces thereof with pressing surfaces 31a and 32a. Formed on the pressing surfaces 31a and 32a are plural catch projections (auxiliary fixing function portions) 31b and 32b that extend in the left-right direction. As indicated by the two-dot chain line in FIG. 4, the frame 3 is disposed under flexed conditions in the helmet 100. When the frame 3 resiliently restores the original shape thereof, the pressing surfaces 31a and 32a come into contact with an inner surface of the helmet 100 as indicated in FIG. 1. Here, the catch projections 31b and 32b catch an interior liner member 101 of the helmet 100. The interior liner member 101 is formed of a cushioning material, fibrous material, or the like.

In this embodiment, the HMD assembly 1 is disposed inside the helmet 100 with the frame 3 kept under flexed conditions. When the flexed frame 3 resiliently restores the original shape thereof inside the helmet 100, the pressing surfaces 31a and 32a of the pressing parts 31 and 32 are pressed against and attached on the inner surface of the helmet 100 as indicated in FIG. 1. When it is desired to detach the HMD assembly 1 from the helmet 100, on the other hand, the frame 3 is flexed to separate the pressing surfaces 31a and 32a from the interior liner member 101 so that the pressing surfaces 31a and 32a are rendered hard to receive a frictional force and a resistance force from the helmet 100 and the HMD assembly 1 can hence be easily detached. When it is desired to use the HMD assembly 1 for the user's head, the pressing parts 31 and 32 of the frame 3 are fixed on the inner surface of the helmet 100.

In this state, the goggle-shaped frame 10 can be rotated in the pitch direction P about the pitch rod portion 62 and can also be rotated in the yaw direction Y about the yaw rod portion 63. Accordingly, the user can rotate the display unit main body 2 in a desired direction. Further, the notch 71 is formed in a front wall of the bridge portion 13 so that, when it is desired to rotate the goggle-shaped frame 10 in the pitch direction P, the yaw rod portion 63 enters the notch 71 and the display unit main body 2 can be rotated into a substantially horizontal state.

In this embodiment, the HMD assembly 1 is disposed inside the helmet 100 so that during operation of the saddle riding vehicle, the effect of an external pressure such as wind pressure on the HMD assembly 1 can be suppressed. Further, when it is desired to attach or detach the HMD assembly 1 to or from the helmet 100, it is only necessary to flex the frame 3 so that the HMD assembly 1 can be easily attached or detached. Furthermore, the HMD assembly 1 is configured to be attached or detached by using the resiliency of the frame 3, and therefore can be attached to plural helmets of different kinds and ensures wide application versatility for various helmets without needing a complex attachment configuration.

The catch projections 31b and 32b are arranged on the pressing surfaces 31a and 32a at the opposite ends of the frame 3, and catch the cushioning material, fibrous material or the like as the interior liner member 101 of the helmet. Compared with a situation that the catch projections 31b and 32b are not arranged, the pressing surfaces 31a and 32a can be more easily fixed to the inner side of the helmet 100 and therefore the HMD assembly 1 is prevented from sliding or rotating as a whole relative to the helmet 100. It is hence possible to stabilize the fixing of the HMD assembly 1 upon its attachment.

The display unit main body 2 and the frame 3 are connected together at the single location by the connecting part 4, and the display unit main body 2 is connected at one point via the yaw rod portion 63. Assuming that the frame 3 and the display unit main body 2 are connected together at plural locations, the distance between the points of each two connected locations tends to vary when the frame 3 is flexed, and as a consequence, a force also acts in the flexing direction on the display unit main body 2. In this embodiment, however, it is configured that the frame 3 and the display unit main body 2 are connected together at the one point of the yaw rod portion 63 in the connecting part 4. Compared with a configuration that the display unit main body 2 is supported at plural locations, the effects of flexing of the frame 3 on the display unit main body 2 can thus be reduced in this embodiment.

The connecting part 4 is provided with the mechanism for rotation in the pitch direction P, the mechanism having the pitch rod portion 62 and the pitch-rod-portion fitting slot 70. Therefore, in a state that the user wears the helmet 100 with the HMD assembly 1 mounted thereon, the user can rotate the display unit main body 2 in the pitch direction P in conformity to his facial configurations, and the display unit main body 2 can be held in an attitude in which the display unit main body 2 has been rotated in the up-down direction.

It is, therefore, configured that by the mechanism for rotation in the pitch direction P, the display unit main body 2 can be adjusted according to the individual differences of the user. In particular, the display unit main body 2 can be inclined over at least 90 degrees in the pitch direction P from the position presented in FIG. 1. As a consequence, the user of the goggles can bring the display unit main body 2 into an attitude with the display unit main body 2 rotated upwardly, and can then easily attach or detach the goggles.

The connecting part 4 is also provided with the mechanism for rotation in the yaw direction Y, the mechanism having the yaw rod portion 63 and the yaw-rod-portion fitting slot 45. Therefore, in a state that the user wears the helmet 100 with the HMD assembly 1 mounted thereon, the user can rotate the display unit main body 2 in the yaw direction Y according to the differences in configurations between the left and right sides of his face. It is, therefore, configured that by the mechanism for rotation in the yaw direction Y, the display unit can be adjusted in position according to the individual differences of the user.

The connecting part 4 is provided with sliding function configured to allow the display unit main body 2 to slidingly move along the frame 3. Therefore, in a state that the user wears the helmet 100 with the HMD assembly 1 mounted thereon, the user can allow the display unit main body 2 to slide in conformity to the positions of both eyes of the user. It is, accordingly, configured that the positional adjustment of the display unit main body 2 is feasible according to the individual differences of the user.

Second Embodiment

Figure 5:
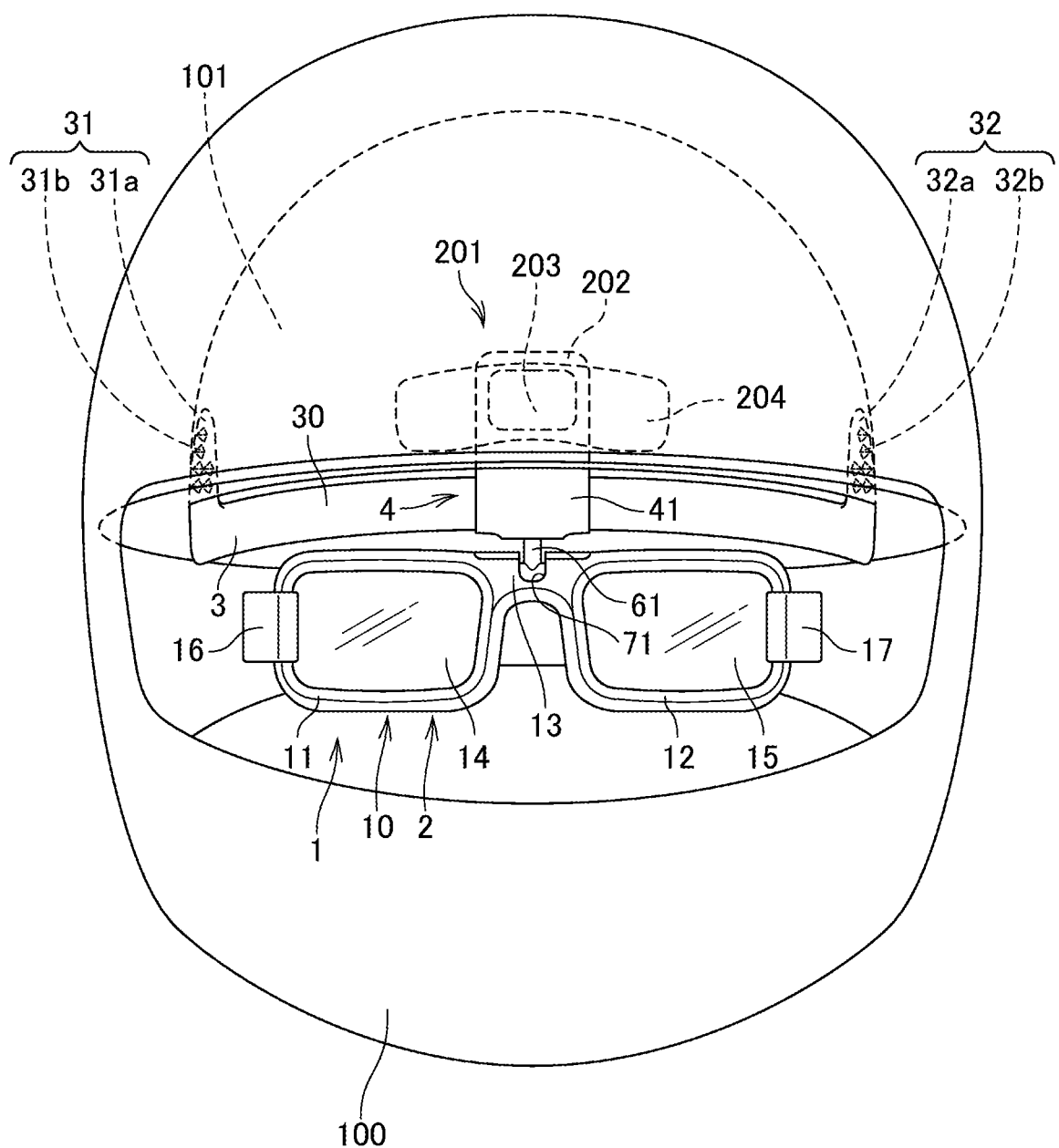
FIG. 5 is an explanatory diagram when an HMD assembly according to a second embodiment of the present invention has been mounted on a helmet.

FIG. 5 is an explanatory diagram of a second embodiment.

In an HMD assembly 1 according to the second embodiment, the connecting part 4 is provided with an auxiliary fixing mechanism 201 for a central section of the HMD assembly 1. Like elements to those in the figures of the first embodiment are identified by like reference symbols, and their description is omitted. The auxiliary fixing mechanism 201 has an extending part 202 formed integrally on an upper portion of the front cover 41 of the connecting part 4. The extending part 202 is formed in a tabular shape bent progressively rearward in an upward direction. On a front surface of the extending part 202, a hook portion 203 of a hook-and-loop fastener is fixedly supported. On a front part of the inner side of the helmet 100, on the other hand, a loop portion 204 of the hook-and-loop fastener is fixedly supported. The loop portion 204 is arranged in a state that it is long in the left-right direction so that the hook portion 203 and the loop portion 204 are arranged to be still interlockable with each other even if the connecting part 4 moves in the sliding direction S. By the extending part 202, hook portion 203 and loop portion 204, the auxiliary fixing mechanism 201 is formed.

In the second embodiment, the HMD assembly 1 is attached to the helmet 100 by the resiliently restoring force of the frame 3 and the interlocking force between the hook portion 203 and the loop portion 204 of the hook-and-loop fastener.

Therefore, the HMD assembly 1 is configured to be detachable by resiliently deforming the frame 3 and separating the hook portion 203 and loop portion 204 of the hook-and-loop fastener from each other. In the second embodiment, as in the first embodiment, the HMD assembly 1 is also mounted on the inner side of the helmet 100 and the effects of an external force such as a wind pressure on the HMD assembly 1 are also suppressed. Owing to the attachment making use of flexing of the frame 3 and the hook-and-loop fastener, wide application versatility and easy attachability and detachability are ensured.

In the second embodiment, the auxiliary fixing mechanism 201 is disposed in accordance with the central section of the HMD assembly 1 in the left-right direction, where the gravity of the display unit main body 2 tends to act, so that the HMD assembly 1 can be easily mounted in a stable state on the helmet 100. It is to be noted that as the auxiliary fixing mechanism 201 for the central section, the HMD assembly 1 can be fixed by sandwiching the interior liner member 101 of the helmet 100 between portions of a clip (not depicted). As a further alternative, it is also possible to adopt a configuration that members, which are attracted each other by the magnetic force of a magnet (not depicted), are disposed on the helmet 100 and the extending part 202, individually, to fix the HMD assembly 1 on the helmet 100. When a clip or the like is used, the extending part 202 may be formed integrally with the clip or the like or may be a string (not depicted) that connects the clip and the frame 3 together. As a still further alternative, it is also possible to adopt a configuration that instead of disposing at one location the auxiliary fixing mechanism 201 for fixing the HMD assembly 1 in accordance with the central section on the helmet 100, auxiliary fixing mechanisms can be also disposed at respective two locations, on the frame 3 at both sides of the connecting part 4 if the cover unit 40 is slidable in the sliding direction S.

The above-described embodiments merely illustrate one aspect of the present invention, and can be modified or applied as desired within a scope not departing from the spirit of the present invention.

In the first embodiment and second embodiment, the description was made of the configuration that the pressing parts 31 and 32 of the frame 3 are provided with the catch projections 31b and 32b as auxiliary fixing mechanisms for the opposite ends of the frame 3. As an alternative, it is possible to adopt a configuration that rubber pads are disposed to produce an increased frictional force. In addition, associated members are also needed on the side of the helmet 100. In this respect, it is also possible to adopt a configuration that uses a hook-and-loop fastener or an attractive force by a magnet.

In the first embodiment and second embodiment, the configuration that the frame 3 of the HMD assembly 1 engages the interior liner member 101 of the helmet 100 was exemplified. In a configuration that a cushioning material or the like as the interior liner member 101 disposed in the helmet 100 is attachable and detachable, it is possible to adopt a configuration that the frame 3 is disposed and attached between the cushioning material and an impact absorber for the helmet 100. In this modification, auxiliary mechanisms may also be disposed on the inner surfaces of the pressing parts 31 and 32.

DESCRIPTION OF REFERENCE SYMBOLS

2 Display unit
3 Frame
4 Connecting part
P Pitch direction
Y Yaw direction
31, 32 Pressing part

The invention claimed is:

1. An information display assembly comprising:
a display unit displaying information; and
a frame connected to the display unit to allow mounting of the display unit on a helmet, wherein
the frame has a frame main body that is in a form of a thin strip and that is bent in an arcuate form to have resiliency and the frame main body is provided with pressing parts respectively provided at each of opposite ends of the frame main body, the pressing parts are provided with pressing surfaces on outer surfaces of the pressing parts, the outer surfaces of the pressing parts being located at outer sides of the frame main body, the frame is configured to be disposed inside the helmet under flexed conditions in an arcuate shape with the pressing surfaces of the pressing parts fixed on an inner surface of the helmet by restoring force of resilient deformation of the frame main body,
the display unit and the frame are commonly provided at a single location therebetween with a connecting part, and
the display unit is displaceably supported relative to the frame.

2. The information display assembly according to claim 1, wherein the connecting part is provided with a mechanism for rotation in a pitch direction.

3. The information display assembly according to claim 2, wherein the connecting part is provided with a mechanism for rotation in a yaw direction.

4. The information display assembly according to claim 3, wherein the connecting part is provided with a sliding function configured to allow the display unit to slidingly move along the frame.

5. The information display assembly according to claim 4, wherein the pressing parts are provided with auxiliary fixing function portions, respectively.

6. The information display assembly according to claim 3, wherein the pressing parts are provided with auxiliary fixing function portions, respectively.

7. The information display assembly according to claim 2, wherein the connecting part is provided with a sliding function configured to allow the display unit to slidingly move along the frame.

8. The information display assembly according to claim 7, wherein the pressing parts are provided with auxiliary fixing function portions, respectively.

9. The information display assembly according to claim 2, wherein the pressing parts are provided with auxiliary fixing function portions, respectively.

10. The information display assembly according to claim 1, wherein the connecting part is provided with a mechanism for rotation in a yaw direction.

11. The information display assembly according to claim 10, wherein the connecting part is provided with a sliding function configured to allow the display unit to slidingly move along the frame.

12. The information display assembly according to claim 11, wherein the pressing parts are provided with auxiliary fixing function portions, respectively.

13. The information display assembly according to claim 10, wherein the pressing parts are provided with auxiliary fixing function portions, respectively.

14. The information display assembly according to claim 10, wherein the display unit has a goggle frame with left and right rim parts connected via a bridge portion, each of the left and right rim parts supporting a transmission display element on which information is to be displayed,
the mechanism for rotation in the yaw direction includes a yaw rod portion that is connected to the bridge portion and extends in the yaw direction, and the display unit is connected to the frame at one point via the yaw rod portion.

15. The information display assembly according to claim 1, wherein the connecting part is provided with a sliding function configured to allow the display unit to slidingly move along the frame.

16. The information display assembly according to claim 15, wherein the pressing parts are provided with auxiliary fixing function portions, respectively.

17. The information display assembly according to claim 1, wherein the pressing parts are provided with auxiliary fixing function portions, respectively.

18. The information display assembly according to claim 1, wherein the pressing parts extend upward from the frame main body when the frame is disposed inside the helmet under flexed conditions in an arcuate shape with the pressing surfaces of the pressing parts fixed on the inner surface of the helmet by restoring force of resilient deformation of the frame main body.

19. The information display assembly according to claim 1, wherein a plurality of catch projections are provided on the pressing surfaces of the pressing parts, the plurality of catch projections projecting outwardly from the pressing surfaces of the pressing parts.

* * * * *